Nov. 14, 1933. N. W. ELMER 1,935,437
CONVEYER
Filed Jan. 12, 1933
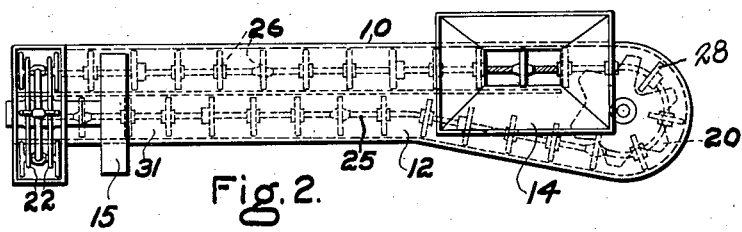
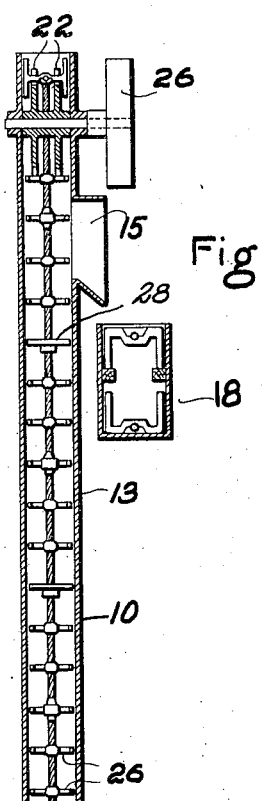
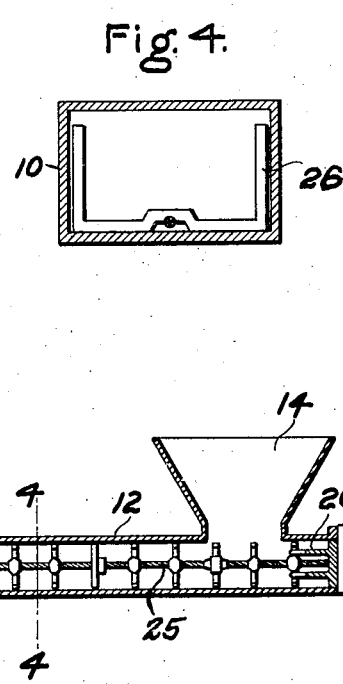
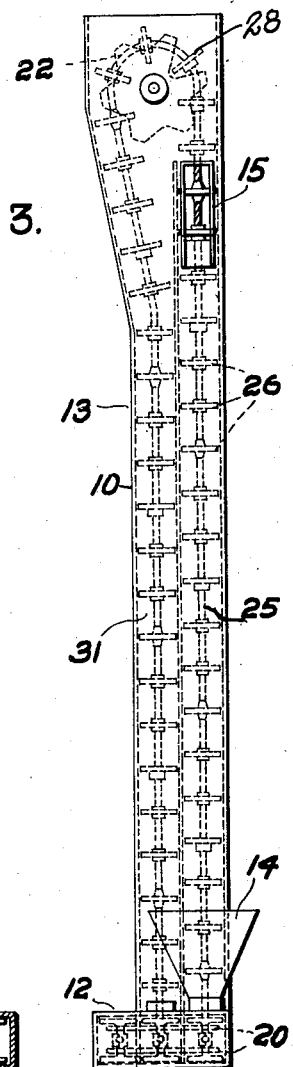
INVENTOR
Nixon W. Elmer
BY J. Stanley Churchill
ATTORNEY Patented Nov. 14, 1933

1,935,437

UNITED STATES PATENT OFFICE 1,935,437

CONVEYER

Nixon W. Elmer, Oak Park, Ill., assignor to Redler Conveyor Company, Quincy, Mass., a corporation of Massachusetts Application January 12, 1933. Serial No. 651,334

2 Claims. (Cl. 198—168)

This invention relates to a conveyer for conveying flowable solid material.

The object of the invention is to provide a novel and improved conveyer of the character specified in which provision is made for effecting the conveyance of the flowable solid material by a conveying element of open structure operating in accordance with the disclosure in the Redler Reissue Patent No. 18,445, and which in addition has provision whereby the entire load or contents of the conveyer may be discharged at the end of a run.

With this general object in view, the invention consists in the conveyer and in the various structures, arrangements and combinations of parts hereinafter described and particularly defined in the claims at the end of this specification.

In the drawing illustrating the preferred embodiment of the invention, Fig. 1 is a vertical sectional view through a conveyer embodying the present invention; Fig. 2 is a plan of the same; Fig. 3 is a side elevation of the conveyer shown in Fig. 1; and Fig. 4 is a cross section on line 4—4 of Fig. 1.

The present invention contemplates a conveyer comprising a casing provided with an inlet and an outlet and with a conveying element having a plurality of spaced flexibly connected transversely extended flights arranged to be drawn through the casing to effect the conveyance therethrough of the solid flowable material. The conveying element may and preferably will be provided with a plurality of transversely extended open flights of a structure such as is disclosed in the Redler Reissue Patent No. 18,445, and which cooperate with opposed portions of the casing to enable the open flight conveying element to effect conveyance of the flowable solid material in a continuous stream, both horizontally and through various degrees of elevation. For some purposes, however, and particularly where the conveyer is designed to elevate the material, it is desirable at the end of a run to discharge the complete load from or contents of the conveyer casing, such for example as in those instances where it is desirable to convey a predetermined mass of material and to insure that the entire material be delivered. With the structure disclosed in the Redler Reissue Patent No. 18,445, the vertical leg of the conveyer casing remains filled or partially filled with material, after all of the load has been introduced into the casing, thus precluding the discharge of the entire contents of the conveyer.

Referring now to the drawing, the illustrated conveyer comprises a casing 10 having a horizontal leg 12 and a vertical leg 13. An inlet 14 is provided in the horizontal leg 12 through which the solid flowable material to be conveyed is introduced into the casing to be conveyed through the casing and discharged therefrom through a discharge opening 15 in the vertical leg 13 of the casing. As illustrated in Fig. 1, the material being discharged through the discharge opening 14 is adapted to be delivered into a horizontal conveyer 18 to be conveyed to a further destination. The casing 10 has journalled in each end thereof sprockets 20, 22 over which an endless conveying element 25 is arranged to pass, and as herein shown the upper sprocket 22 is designed to be driven through a driving pulley 26 belted to any convenient source of power, not shown. In order to permit the solid flights to pass over the sprockets, the latter may and preferably will be provided with recesses not herein shown but which are adapted to receive such solid flights, as set forth in my copending application 651,333, filed on even date herewith. In the illustrated conveyer the casing 10 is provided with a return leg 31 for the return run of the endless conveyer. Except as will be hereinafter pointed out, the details of construction and the mode of operation of the illustrated conveyer may and preferably will be as shown and described in the Redler reissue patent above referred to, for the elevation of the solid flowable material above angles greater than the angle of repose of the material, and in which the open flights are characterized by cooperation with opposed walls of the conduit or casing.

Experience with conveyers of the construction illustrated in the Redler reissue patent above referred to has demonstrated that while the open flight conveying element is capable of discharging the entire contents of the conveyer casing at the end of any particular run as long as the conveyer operates in a horizontal direction, nevertheless, when the conveyer is used to elevate materials, above the angle of repose of the material, the open flight conveying element will not function to lift the last portion of the contents of the conveyer casing so that it has been impossible in practice to effect complete emptying of the conveyer casing at the end of any particular run. In accordance with the present invention, the conveying element 25 of the present conveyer is provided with a plurality of spaced flexibly connected flights 26 of open structure, the details of which may comprise any of those illustrated in and forming the subject matter of the Redler reissue patent. As illustrated in Fig. 4 hereof, such form of open conveyer flight comprises a U-shaped flight. The conveying element 25 is further provided with one or more solid flights 28 adapted to cooperate with the interior of the conveyer casing so that at the end of any particular run a solid flight 28 will operate to carry up through the vertical leg 13 of the conveyer casing 10 the last portions of the contents of the conveyer and effect complete discharge of the entire contents through the discharge opening 15 located in the vertical leg. With this construction of conveying element 25, all of the advantages of the open flight type of conveyer are obtained, including the ability to discharge material from various points along the conveyer casing and below the head sprocket at the top of the vertical leg, and at the same time the complete conveyer is adapted to those uses where it is essential to discharge the entire contents of the casing at the end of a particular run. This condition is absolutely essential in the grain field as governmental regulation requires every grain elevator to weigh each carload lot of grain received separately and in an approved manner. As a matter of practice the weighing scales are almost universally located at the top of the grain elevator so that it becomes essential to effect complete discharge of the entire contents of the conveyer casing in order to effect the required weighing of each carload lot of grain.

While the preferred embodiment of the invention has been herein illustrated and described, it will be understood that the invention may be embodied in other forms within the scope of the following claims.

Having thus described the invention, what is claimed is:—

1. A conveyer for conveying flowable solid material in bulk comprising a casing having an inlet and an outlet, and a conveying element adapted to be drawn through the casing to effect the conveyance of the flowable solid material therethrough, said conveying element being provided with a plurality of spaced flexibly connected flights of open structure cooperating with opposed portions of the interior of the casing to effect the conveyance of the material in a continuous stream and also provided with at least one solid flight adapted to effect the discharge of the entire contents of the conveyer casing at the end of any particular run.

2. A conveyer of the character specified comprising a casing provided with a horizontal and a vertical leg, an inlet in the horizontal leg, a discharge outlet located in the vertical leg, and a conveying element adapted to be drawn through said horizontal and vertical legs to effect the conveyance of the solid flowable material from the inlet to the outlet, said conveying element comprising a plurality of spaced flexibly connected flights of open structure adapted to effect conveyance of the material in a continuous stream and also at least one solid flight adapted to convey the last portions of the contents of the conveyer casing to the discharge outlet at the end of any particular run.

NIXON W. ELMER.